US012073808B2

(12) United States Patent
Anderson et al.

(10) Patent No.: US 12,073,808 B2
(45) Date of Patent: Aug. 27, 2024

(54) AV OVER IP TERMINAL WITH BIDIRECTIONAL VIDEO STREAMING

(71) Applicant: Mimo Display LLC, Libertyville, IL (US)

(72) Inventors: David W Anderson, Libertyville, IL (US); Tom Doddridge, Libertyville, IL (US); Wojciech Przeczkowski, Libertyville, IL (US)

(73) Assignee: MIMO Display LLC, Libertyville, IL (US)

( * ) Notice: Subject to any disclaimer, the term of this patent is extended or adjusted under 35 U.S.C. 154(b) by 1 day.

(21) Appl. No.: 18/316,819

(22) Filed: May 12, 2023

(65) Prior Publication Data

US 2023/0410765 A1    Dec. 21, 2023

Related U.S. Application Data

(60) Provisional application No. 63/343,439, filed on May 18, 2022.

(51) Int. Cl.
*G09G 5/00* (2006.01)
*G06F 3/14* (2006.01)
*G06F 3/044* (2006.01)
*G06F 3/045* (2006.01)

(52) U.S. Cl.
CPC .............. *G09G 5/006* (2013.01); *G06F 3/14* (2013.01); *G06F 3/044* (2013.01); *G06F 3/045* (2013.01); *G09G 2354/00* (2013.01); *G09G 2370/02* (2013.01)

(58) Field of Classification Search
CPC ............ G06F 3/044; G06F 3/045; G06F 3/14; G09G 2354/00
See application file for complete search history.

(56) References Cited

U.S. PATENT DOCUMENTS

2020/0272404 A1*  8/2020  Mu .................... G06F 13/4282
2021/0144335 A1*  5/2021  Pang .................. G06F 13/4282

\* cited by examiner

*Primary Examiner* — Van N Chow
(74) *Attorney, Agent, or Firm* — McDonnell Boehnen Hulbert & Berghoff LLP

(57) ABSTRACT

Improved systems are provided for implementing low-cost, low-power, highly compatible bidirectional video and user interface links. These systems permit a remote terminal to present a video user interface (e.g., a touchscreen interface) and to receive an HD video stream for a base system that is in communication with the terminal via Internet Protocol or some other low-cost, reliable long-distance communication means. To reduce complexity, bandwidth requirements, and power, transmission of HD video from the terminal to the base can be accomplished using a system-on-chip that performs video compression, which may be essentially lossless, and that transmits the compressed stream over a network interface. The transmission of video from the base to the terminal can be accomplished in a lossy and/or lower-resolution manner via a USB-over-network channel. This channel can then be instantiated at the base unit as a video-over-USB device, improving compatibility and reducing configuration requirements at the base.

20 Claims, 3 Drawing Sheets

AV OVER IP TERMINAL WITH BIDIRECTIONAL VIDEO STREAMING

CROSS-REFERENCE TO RELATED APPLICATION

The present application is a non-provisional patent application claiming priority to U.S. Provisional Patent Application No. 63/343,439, filed on May 18, 2022, the contents of which are hereby incorporated by reference.

BACKGROUND

A variety of commercially available devices allow the user interface of a computing device (e.g., a display, mouse or touch input, and/or some additional or alternative user inputs and/or outputs) to be provided at a distance from the computing device. For example, a terminal device can be provided at a podium of an auditorium to allow a user to interact with a remotely located computing device (e.g., located in a projection booth or IT cabinet) in order to control a projector, access data, control room lights, or to perform some other operations. Such a terminal device could be configured to communicate with the remote computing device over an Internet Protocol (IP) connection (e.g., Ethernet, WiFi). This could be done to facilitate communication with the remote computing device in a low-cost, high-bandwidth, and easily modifiable manner that is also not limited with respect to distance. The remote computing device could be configured to communicate with the terminal device natively over IP. Alternatively, a base device could connect to the remote computing device via standard inputs/outputs (e.g., HDMI, USB), reducing the need for specialized drivers and configurations to be installed on the remote computing device. Such a base device, communicating with a paired terminal device over IP, could facilitate operation of the remote computing device by a user located at the terminal device in a manner that is essentially, or nearly essentially, "invisible" to the remote computing device

SUMMARY

In a first aspect, a system is provided that includes a base unit and a terminal unit. The base unit includes: (i) a first controller, wherein the first controller includes a first video interface, a first USB interface, and a first network interface; and (ii) a video output connector. The terminal unit includes: (i) a second controller, wherein the second controller includes a second video interface, a second USB interface, and a second network interface; (ii) a touchscreen display comprising a USB touch interface and a display interface, wherein the USB touch interface is communicatively coupled to the second USB interface; (iii) a USB-to-video converter that is communicatively coupled to the second USB interface and that is configured to receive, as a slave device, display data from the second USB interface and to drive the touchscreen display to present the display data; and (iv) a video input connector. The second controller is configured to receive, via the second video interface, an indication of a video input signal that is input into the terminal unit via the video input connector, to encode the video input signal into a compressed video stream, and to transmit an indication of the compressed video stream to the base unit via the second network interface. The first controller is configured to receive, from the terminal unit via the first network interface, an indication of the compressed video stream, to decode the compressed video stream into a video output signal, and to transmit, via the first video interface, an indication of the video output signal to the video output connector. The first controller is configured to present as a USB slave device via the first USB interface, the second controller is configured to present as a USB master device via the second USB interface, and the first and second controllers are configured to communicate with each other via the first and second network interfaces, respectively, to implement a USB-over-network bridge, thereby allowing (i) display information to be received, from a master system via the first USB interface, and transmitted to the USB-to-video converter via the second USB interface, thereby resulting in the touchscreen display being driven to present the display information, and (ii) user input to be received, from the touchscreen display via the second USB interface, and transmitted to the master system via the first USB interface In a second aspect, a system is provided that includes: (i) a controller, wherein the controller includes a video interface, a USB interface, and a network interface; (ii) a touchscreen display comprising a USB touch interface and a display interface, wherein the USB touch interface is communicatively coupled to the USB interface; (iii) a USB-to-video converter that is communicatively coupled to the USB interface and that is configured to receive, as a slave device, display data from the USB interface and to drive the touchscreen display to present the display data; and (iv) a video input connector. The controller is configured to receive, via the video interface, an indication of a video input signal that is input into the terminal unit via the video input connector, to encode the video input signal into a compressed video stream, and to transmit an indication of the compressed video stream to a base unit via the network interface. The controller is also configured to present as a USB master device via the USB interface, and to communicate with the base unit via the network interface to implement a USB-over-network bridge, thereby allowing (i) display information to be received, from a master system via the base unit and transmitted to the USB-to-video converter via the USB interface, thereby resulting in the touchscreen display being driven to present the display information, and (ii) user input to be received, from the touchscreen display via the USB interface, and transmitted to the master system via the base unit.

In another aspect, a non-transitory computer readable medium is provided having stored thereon program instructions executable by at least one processor to cause the at least one processor to perform all or a portion of the operations of one or both of the above systems.

In another aspect a system is provided that includes: (i) at least one processor; and (ii) a non-transitory computer-readable medium, having stored therein instructions executable by the at least one processor to cause the system to perform all or a portion of the operations of one or both of the above systems.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation

DETAILED DESCRIPTION

Figure 1:
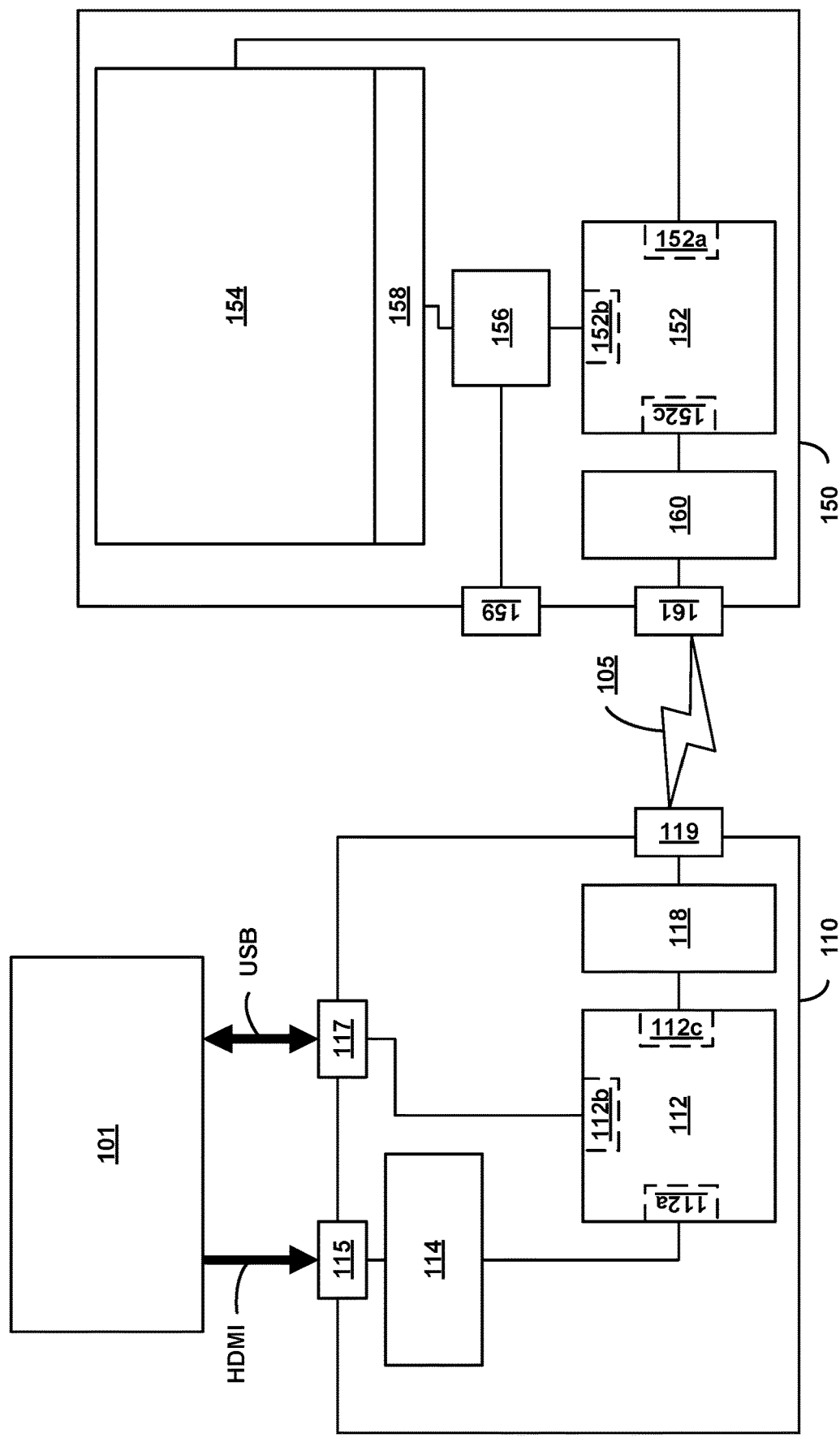
FIG. 1 illustrates aspects of a system, according to an example embodiment.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. OVERVIEW

It should be understood that the below embodiments, and other embodiments described herein, are provided for explanatory purposes, and are not intended to be limiting.

It is beneficial in a variety of applications to allow a user to interact with a computing device (e.g., a computer configured to control projectors, room lights, speakers, or other equipment of an auditorium, classroom, or other presentation space) while at a significant distance from the computing device. For example, to allow a user to interact with a computing device that is located in a projection booth, IT cabinet, in the wall or ceiling of an auditorium, or some other convenient location while the user is located at a podium, on a stage, or at some other location remote from the computing device. Communication between a terminal unit at the user's location and the remote computing device can be provided via IP links (e.g., wired and/or wireless links using commercially available IP infrastructure) or other varieties of reliable, low-cost, long-distance, and extendible communication links in order to allow the location of the terminal unit and remote computing device to be easily and cheaply modified, and to reduce or eliminate limitations on the distance between the terminal and computing device relative to HDMI, USB, or other alternative interconnects.

It is also beneficial for such an interface-over-IP link to be implemented in a way that is relatively "invisible" to the remote computing device, requiring little or no modification of the remote computing device and/or installation of drivers or applications thereon. Providing the remote interface link in such a "plug and play" manner reduces the cost and complication of implementing and maintaining the link, allows the remote computing device to be easily replaced, updated, or modified without requiring the link (and potentially also the remote computing device) to be modified, and reduces the chance that driver updates, OS updates, software or configuration incompatibilities, or other changes to the remote computing device over time will negatively impact the operation of the link. Accordingly, a base unit can be provided and paired with a terminal unit in order to implement some or all of the interface-over-IP (or some other interconnect protocol or interface) functionality. Such a base unit may be connected to the remote computing device via local HDMI, USB, or other local interconnects in a manner that appears, to the remote computing device, as though a display, USB input unit (e.g., keyboard, mouse, touch-based interface), USB hub, or other peripheral device was available to the remote computing device locally, rather than being located at or as part of the terminal unit. The provision of the resources (display, input, video input, USB port(s)) of the terminal unit to the remote computing device in this manner may reduce configuration complexity by, in some examples, using only 'standard' interface formats and drivers, allowing the resources of the terminal unit to be provided to the remote computing device in a truly "plug and play" manner.

FIG. 1 illustrates an example system that includes a base unit 110 in communication, via an IP link 105, with a terminal unit 150. The terminal unit 150 includes a touchscreen display that includes a display 154 and a touchscreen controller 158 configured to detect the location and/or other information (e.g., pressure) of touches on the display 154. The base unit 110 and terminal unit 150 are configured to operate together to provide a remote user experience at the terminal unit 150 over the IP link 105 as though the terminal unit 150 was an HDMI display and USB-connected input device connected to a remote computing device 101 via an HDMI output ("HDMI") and a USB port ("USB") of the remote computing device 101.

The IP link 105 may include access points, switches, routers, DNS servers, cables, repeaters, or other elements of an IP-compatible network sufficient to allow the base unit 110 and terminal unit 150 to communicate with each other using IP. This could include an external connector 119 (e.g., an Ethernet jack) of the base unit 110 being connected via an Ethernet cable (e.g., a crossover cable) to an external connector 161 (e.g., an Ethernet jack) of the terminal unit 150. Additionally or alternatively, one or both of the base unit 110 or terminal unit 150 could include a WiFi radio or other element(s) configured to provide a wireless IP-compatible communication link.

The base unit 110 includes a first controller 112 configured to provide some of the functionality of the base unit 110. The first controller 112 includes a first video interface 112a, a first USB interface 112b, and a first network interface 112c. The first video interface 112a is communicatively coupled to a video input connector 115 via an optional video transceiver 114 (e.g., an HDMI video signal transceiver) that is configured to provide a compatible electrical interface with other devices' HDMI outputs or other video output signals. Alternatively, such functionality could be provided natively by the first controller 112 (e.g., an HDMI transceiver could be implemented as part of the first controller 112). The first USB interface 112b is communicatively coupled to a USB input connector 117 (e.g., via electrostatic discharge (ESD) limiting components, filters, or other elements (not shown)). The first controller 112 is also communicatively coupled to a first network connector 119 via an optional network interface 118 (e.g., an Ethernet PHY chip) that is configured to provide a compatible electrical interface with other devices' network outputs (e.g., Ethernet connections, coaxial cable connections, optical fiber connections) or other IP-compatible network signals. Alternatively, some or all of such functionality could be provided natively by the first controller 112 (e.g., level shifters, differential amplifiers, filter, or other elements of an Ethernet-compatible PHY layer could be implemented as part of the first controller 112, while magnetics or other elements could be implemented by additional components, e.g., by magnetics integrated into the network connector 119).

The terminal unit 150 includes a second controller 152 configured to provide some of the functionality of the terminal unit 150. The second controller 152 includes a second video interface 152a, a second USB interface 152b, and a second network interface 152*c*. The second video interface 152*a* is communicatively coupled to a display 154 of the terminal unit 150. The second USB interface 152*b* is communicatively coupled to a touchscreen controller 158 via an optional USB hub 156 (e.g., a standalone USB hub integrated circuit and/or associated components). Alternatively, the second controller 152 could be communicably coupled directly to the touchscreen controller 158 and/or the functionality of a USB hub could be provided natively by the second controller 152 (e.g., a USB hub could be implemented as part of the second controller 152, with multiple downstream ports of the USB hub connected to pins or other electrical interfaces of the second controller 152). The touchscreen controller 158 is configured to operate as a USB slave input peripheral device, providing information about touch or other inputs detected as a result of user interactions with the display 154. Thus, the touchscreen controller 158 could be part of an integrated module with the display 154. Additionally or alternatively, aspects of the touchscreen controller 158 could be implemented as separated devices/elements from the display 154, e.g., as a controller IC electrically coupled to one or more resistive or capacitive electrodes laminated onto/into or otherwise incorporated with the display 154 to facilitate detection of the location, motion, pressure, or other properties of user touch interactions with the display 154.

The second USB interface 152*b* is also communicatively coupled (e.g., via ESD limiting-components, filters, or other elements (not shown)) to one or more additional USB input connectors 159 (e.g., to permit keyboards, mice, or other USB slave peripheral devices to be connected to the terminal unit 150) via the optional USB hub 156. The second controller 152 is also communicatively coupled to a second network connector 161 via an optional network interface 160 that is configured to provide a compatible electrical interface with other devices' network outputs or other IP-compatible network signals. Alternatively, some or all of such functionality could be provided natively by the second controller 152.

The first 112 and second 152 controllers are configured to facilitate a user operating the remote computing device 101 by "extending" the user interface (specifically, the HDMI and USB interfaces of the remote computing device 101) via the IP link 105 to the terminal unit 150 (specifically, the display, touchscreen controller, and any optional USB devices connected to the terminal unit 150). In order to implement such an "extension," the first controller 112 receives a video signal from the remote computing device 101 (via the video input 115), encodes the video signal into an encoded video signal, and transmits an indication of the encoded video signal to the terminal unit 150 via the network connector 119 and IP link 105. The second controller 152 is configured to receive, via the network connector 161 and IP link 105, an indication of the transmitted encoded video signal, decode the encoded video signal, and provide the decoded video signal to the display 154, via the second video interface 152*a*, so as to provide the video output from the remote computing device 101 to a user via the display 154 of the terminal unit 150.

To implement the USB aspect of the "extension," the first controller 112 presents as a USB slave device via the first USB interface 112*b*, the second controller 152 presents as a USB master device via the second USB interface 152*b*, and the first 112 and second 152 controllers communicate via the IP link 105 to relay USB information from the remote computing device 101 (acting as a USB master device) to the touchscreen controller 158 and/or other USB devices (e.g., keyboards, mice, or other user input devices or other types of USB devices, acting as USB slave devices). This could include implementing the USB extension as though the combination of the base unit 110 and terminal unit 150 were a USB hub with an upstream link at the USB connector 117 and downstream link(s) at the USB hub 156, touchscreen controller 158, and/or additional USB connector(s) 159.

It is desirable in some applications to provide a video stream (e.g., a high-bandwidth HD video stream) from such a terminal unit to the remote computing device. For example, to allow a presenter to stream a video from their laptop or other device, or to stream video of a presenter to a projector or other screen of an auditorium or other presentation space. However, it can be difficult to accomplish such bidirectional video streaming in a cost-effective manner, especially if the video streamed from the terminal to the base is high-bandwidth (e.g., 4K or greater resolution, or resolution and/or bandwidth sufficient to easily understandably reproduce text) and/or requires low latency (e.g., less than 100 millisecond latency, so as to reduce delay between the presenter's motions/speech and their projection/display on a screen). For example, the controllers 112/152 of the system of FIG. 1 could be duplicated (one set for "downlink" video to the display 154, and another for "uplink" video from the terminal unit 150 to the remote computing device 101); however, such a solution many unacceptably increase the cost (in parts, licensing, etc.), size, power budget, reliability, or other constraints imposed on the system In many applications, the requirements for resolution, latency, and bandwidth regarding video presented at the terminal unit (e.g., on the display 154 of the terminal unit 150) are less, and potentially significantly less, than the requirements for video received at the terminal unit (e.g., from a camera capturing a presenter) and sent to a base unit and from the base unit on to a remote computing device, projector, video switch, etc. Thus, it can be beneficial to 'reverse' the directionality of video encoding/decoding and transmission, so as to reserve the higher-bandwidth, lower-latency, or otherwise improved video processing and transmission capabilities of a terminal/base system for the video stream received at the terminal unit and sent to the base unit. The video stream for display at the terminal unit (e.g., video output from a remote computing device and transmitted to the terminal unit from a base unit collocated with the remote computing device) could be handled in a lower-resolution, lower-bandwidth, and/or higher-latency manner. This lower level of video performance can permit the terminal unit display stream to be transmitted via the USB link (e.g., via a video-over-USB profile within the USB standard or implemented in some other way to facilitate streaming of video through the USB protocol) that is also implemented by the controllers of the base unit and terminal unit. This would allow the desired functionality (low-latency streaming of high-resolution video with minimal compression from the terminal unit to the base unit and transmission of lower-quality video from the base unit to the display of the terminal unit) while minimally impacting the cost, complexity, power, size, compatibility, or other factors relating to the system.

Figure 2:
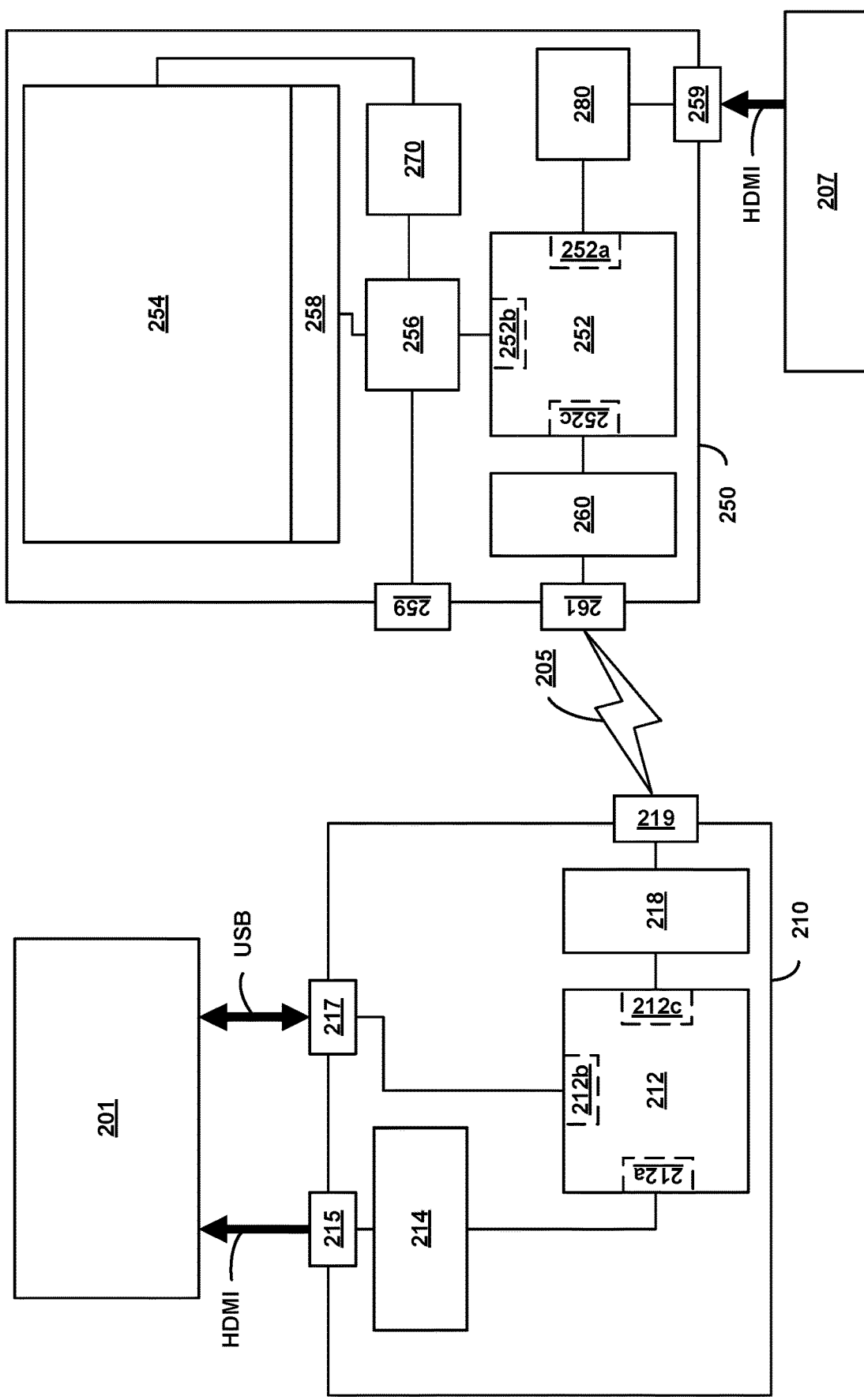
FIG. 2 illustrates aspects of a system, according to an example embodiment.

FIG. 2 illustrates an example system that includes a base unit 210 in communication, via an IP link 205, with a terminal unit 250. The terminal unit 250 includes a touchscreen display that includes a display 254 and a touchscreen controller 258 configured to detect the location and/or other information (e.g., pressure) of touches on the display 254. The base unit 210 and terminal unit 250 are configured to operate together to provide a remote user experience at the terminal unit 250 over the IP link 205 as though the terminal unit 250 was video-over-USB display and USB-connected input device connected to a remote computing device 101 via a USB port ("USB"). The base unit 210 and terminal unit 250 are also configured to operate together to receive, via a connector 259 on the terminal unit 250, an HDMI video stream ("HDMI") from a video source 207 (e.g., a presenter's laptop, a camera, some other video source) and to provide that HDMI video stream, in a relatively unaltered (e.g., compressed and decompressed in a manner such that text is still easily readable) and low-latency manner via a connector 215 on the base unite 210 to a video receiver device (as illustrated by way of example in FIG. 2, a video input of the remote computing device 101).

The IP link 205 may include access points, switches, routers, DNS servers, cables, repeaters, or other elements of an IP-compatible network sufficient to allow the base unit 210 and terminal unit 250 to communicate with each other using IP. This could include an external connector 219 (e.g., an Ethernet jack) of the base unit 210 being connected via an Ethernet cable (e.g., a crossover cable) to an external connector 261 (e.g., an Ethernet jack) of the terminal unit 250. Additionally or alternatively, one or both of the base unit 210 or terminal unit 250 could include a WiFi radio or other element(s) configured to provide a wireless IP-compatible communication link.

The base unit 210 includes a first controller 212 configured to provide some of the functionality of the base unit 210. The first controller 212 includes a first video interface 212a, a first USB interface 212b, and a first network interface 212c. The first video interface 212a is communicatively coupled to the video output connector 215 via an optional video transceiver 214 (e.g., an HDMI video signal transceiver) that is configured to provide a compatible electrical interface with other devices' HDMI outputs or other video output signals. Alternatively, such functionality could be provided natively by the first controller 212 (e.g., an HDMI transceiver could be implemented as part of the first controller 212). The first USB interface 212b is communicatively coupled to a USB input connector 217 (e.g., via ESD limiting-components, filters, or other elements (not shown)). The first controller 212 is also communicatively coupled to a first network connector 219 via an optional network interface 218 (e.g., an Ethernet PHY chip) that is configured to provide a compatible electrical interface with other devices' network outputs (e.g., Ethernet connections, coaxial cable connections, optical fiber connections) or other IP-compatible network signals. Alternatively, some or all of such functionality could be provided natively by the first controller 212 (e.g., level shifters, differential amplifiers, filter, or other elements of an Ethernet-compatible PHY layer could be implemented as part of the first controller 212, while magnetics or other elements could be implemented by additional components, e.g., by magnetics integrated into the network connector 219).

The terminal unit 250 includes a second controller 252 configured to provide some of the functionality of the terminal unit 250. The second controller 252 includes a second video interface 252a, a second USB interface 252b, and a second network interface 252c. The second video interface 252a is communicatively coupled to the video input connector 259 via an optional video transceiver 280 that is configured to provide a compatible electrical interface with other devices' HDMI outputs or other video output signals. Alternatively, such functionality could be provided natively by the second controller 252. The second USB interface 252b is communicatively coupled to a touchscreen controller 258 and to a USB-to-video converter 270 via a USB hub 256 (e.g., a standalone USB hub integrated circuit and/or associated components). Alternatively, the second controller 252 could be communicably coupled directly to the touchscreen controller 258, USB-to-video converter 270 and/or the functionality of a USB hub could be provided natively by the second controller 252 (e.g., a USB hub could be implemented as part of the second controller 252, with multiple downstream ports of the USB hub connected to pins or other electrical interfaces of the second controller 252).

The USB-to-video converter 270 is configured to operate as a USB slave video output peripheral device. The USB-to-video converter 270 is coupled to a display 254 of the terminal unit 250 and is operable to communicate, via the extended USB link provided by the controllers 212, 252, with the USB interface of the remote computing device 201, thereby allowing the remote computing device 201 to provide video and images on the display 254. This could include the remote computing device 201 having installed thereon a driver, application, or other programming to facilitate providing user interface display video via the remote computing device's 201 USB interface. The use of a commercially available USB-to-video converter 270 chipset allows driver/application development, security or other updates, and other functionality improvements to be implemented by a third party, reducing cost of maintenance and updating of the terminal unit 250. Further, use of a commercially available USB-to-video converter 270 chipset allows that chipset to be replaced over time (e.g., to account for changing functionality and/or cost) and/or selected for different models of the terminal unit 250 so as to provide different levels of functionality (e.g., display 254 video resolution, frame rate, link stability, level of compatibility with operating systems or applications of interest, etc.). Additionally, the use of a USB-to-video converter 270 that is separate from the second controller 252 allows both elements to be sized specifically to their respective computational tasks (extracting a relatively low-resolution, low-quality, and/or low-frame-rate video stream from a USB channel, and encoding and transmitting a high-quality video signal received from the video input connector 259, respectively), reducing power use and component cost and increasing reliability.

The touchscreen controller 258 is configured to operate as a USB slave input peripheral device, providing information about touch or other inputs detected as a result of user interactions with the display 254. Thus, the touchscreen controller 258 could be part of an integrated module with the display 254. Additionally or alternatively, aspects of the touchscreen controller 258 could be implemented as separated devices/elements from the display 254, e.g., as a controller IC electrically coupled to one or more resistive or capacitive electrodes laminated onto/into or otherwise incorporated with the display 254 to facilitate detection of the location, motion, pressure, or other properties of user touch interactions with the display 254.

The second USB interface 252b may also be communicatively coupled (e.g., via ESD limiting-components, filters, or other elements (not shown)) to one or more additional USB input connectors 259 (e.g., to permit keyboards, mice, or other USB slave peripheral devices to be connected to the terminal unit 250) via the USB hub 256. The second controller 252 is also communicatively coupled to a second network connector 261 via an optional network interface 260 that is configured to provide a compatible electrical interface with other devices' network outputs or other IP-compatible network signals. Alternatively, some or all of such functionality could be provided natively by the second controller 252.

The first 212 and second 252 controllers are configured to facilitate a user operating the remote computing device 201 by "extending" the user interface (specifically, the HDMI and USB interfaces of the remote computing device 201) via the IP link 205 to the terminal unit 250 (specifically, the display, touchscreen controller, and any optional USB devices connected to the terminal unit 250) and also to stream HDMI video from the terminal unit 250 to the base unit 210. In order to implement such an "extension," the second controller 222 receives a video signal from the video source 207 (via the video input 259), encodes the video signal into an encoded video signal, and transmits an indication of the encoded video signal to the base unit 210 via the network connector 261 and IP link 205. The first controller 212 is configured to receive, via the network connector 219 and IP link 205, an indication of the transmitted encoded video signal, decode the encoded video signal, and provide the decoded video signal via the video output connector 215 and first video interface 212a, to a video sink device (e.g., the remote computing device 201, per the depiction of FIG. 2).

To implement the USB aspect of the "extension," the first controller 212 presents as a USB slave device via the first USB interface 212b, the second controller 252 presents as a USB master device via the second USB interface 252b, and the first 212 and second 252 controllers communicate via the IP link 205 to relay USB information from the remote computing device 201 (acting as a USB master device) to the touchscreen controller 258, USB-to-video converter 270, and/or other USB devices (e.g., keyboards, mice, or other user input devices or other types of USB devices, acting as USB slave devices). This could include implementing the USB extension as though the combination of the base unit 210 and terminal unit 250 were a USB hub with an upstream link at the USB connector 217 and downstream link(s) at the USB hub 256, touchscreen controller 258, USB-to-video converter 270, and/or additional USB connector(s) 259. The implementation of the USB-over-IP link by the controllers 212, 252 could be optimized to account for the streaming of high-bandwidth video from the remote computing device 201 to the USB-to-video converter 270. This could include providing increased-size or -speed memory buffers in the controllers 212, 252, implementing quality-of-service for the USB channels to prioritize the link(s) via which the video data is provided to the USB-to-video converter 270, and/or some other improvement.

As shown in FIG. 2, the video output from the base unit 210 (via the video output connector 215) is provided to an HDMI input of the remote computing device 201 (e.g., to allow the remote computing device 201 to record the video, to provide the video as an output via one or more video outputs of the remote computing device 201, to stream the video over the Internet). However, this is only one example of a video "sink" to which the video output of a base unit as described herein could be connected. In other examples, the video output from the base unit 210 could be provided to an AV switch that is controlled by the remote computing device 201 or by some other controller (e.g., an AV controller that is in communication with the remote computing device 201 and that thus can be controlled by a user at the terminal unit 250 by remotely operating the remote computing device 201). The output of such an AV switch could be provided to a projector, screen, or other display device(s) in an auditorium, classroom, or other presentation space where the video input into the terminal unit 250 is to be displayed.

Note that the presence of a touchscreen controller and display as part of a terminal unit is intended as a non-limiting example. In some examples, such a terminal device could lack a screen entirely, and could include a video output connector and one or more USB or otherwise-configured connectors to facilitate the use of display(s) and user input device(s) external to the terminal unit. Additionally or alternatively, the terminal device could include a touchscreen display and such additional outputs/input and could be operable in a first mode to employ the touchscreen and associated display as a user interface, and alternatively to operate in a second mode wherein the user interface is provided by the external display(s) and user input device(s).

The controllers 212, 252 could be configured in a variety of ways (e.g., could be implemented as a variety of different systems-on-chip ("SoC")) to provide the functionality described herein. Such controllers could include general-purpose controllers, CPUs, GPUs, TPUs, ASICs, FPGAs, or otherwise-configured elements. Such controllers could be formed from single integrated circuits and/or from modules of multiple integrated circuits packaged together. Providing the controllers on a single integrated circuit and/or as part of a single SoC that incorporated multiple integrated circuits into a signal package (e.g., by disposing the multiple integrated circuits on a common substrate) can result in reduced cost and complexity, reduced power use, increased reliability, reduced size, or other benefits. One or both of the controllers 212, 252 could be ASpeed AST1620 media controllers. The controllers 212, 252 could be the same controller or different controllers. In some examples, the controllers 212, 252 could have incorporated therein an "IP core" configured to manage the IP link between the terminal unit 250 and base unit 210. Alternatively, one or more elements external to the controllers 212, 252 could implement some or all of the IP link. In some examples, the base 210 and/or terminal 250 units could include additional controllers configured to, e.g., manage boot-up of the units (e.g., initializing and/or loading firmwares or other programming into the controllers 212, 252, initializing the other elements of the units), perform power management of the units, implement status indicators or other low-level operations for the units, provide brownout detection and restart-on-failure functionality, or to provide some other functionality for the units.

The base unit 210 and terminal unit 250 could be configured to pair with each other via a variety of methods. In some examples, such pairing could be factory-set, with particular base units pre-paired with particular terminal units, and with both units capable of performing pings or other network operations sufficient to establish an IP link there between. In some examples, configuration information (e.g., unit IP addresses, gateway addresses, pairing with opposite units, network credentials) could be input into the units using a hardware serial connection and/or USB connection of the units (e.g., using a serial terminal emulator over a USB connection). In some examples, configuration information could be provided on physical media (e.g., removable SD storage) that is loaded into the units. In some examples, the terminal unit could be capable of operation in a "configuration mode," wherein it implements a simplified on-board operating system using the onboard display and touch controller to receive and/or generate configuration information input from a user (e.g., to display a current IP address, unique ID, or other information about the terminal unit).

The optional video transceivers 214, 280 could include ITE Tech IT6802 HDMI transceiver chips. The USB-to-video converter 270 could include a DisplayLink (now Synaptics) DL4120.

Note that, while HDMI is used herein as an example of a high-resolution digital video interconnect standard, it is only intended as a non-limiting example of such a digital video interconnect standard. Wherever HDMI is referenced herein, one of skill in the art will appreciate that alternative digital video interconnect standards, current and to-be-developed, could be substituted without exiting the scope of the subject matter contemplated herein. Further, while the streaming of HDMI or related signals, and the encoding/decoding thereof, are described in relation only to their video content, it will be appreciated by one of skill in the art that such "video" signals may include one or more audio channels associated therewith as described in the HDMI standard or similar audiovisual interconnect standards.

Similarly, while IP links are referenced throughout as a means for transmitting data between terminal and base units as described herein, other communications links, protocols, and means are possible. IP links provide a variety of benefits, including extendibility, reliability, compatibility with existing IT infrastructure (e.g., the ability to use the internet or other existing network infrastructure between the desired locations of a base unit and a terminal unit), bandwidth, configurability, availability of equipment and alternatives, among other benefits. However, additional or alternative communications links, protocols, and technology are possible to implement communications between base units and terminal units as described herein. For example, a restricted version of IP (e.g., that eschews some header information, routing features, fault tolerance, detection, or correction, or other aspects of the Internet Protocol) could be used in scenarios wherein certain features of IP are not needed (e.g., point-to-point links or other simplified network topologies, closed networks, networks that provide enhanced guarantees regarding dropped packets or other faults, etc.) but in order to leverage the other benefits of the use of the remainder of IP (e.g., widespread familiarity of the remaining features of IP, availability of equipment and compatible components, leveraging pre-existing IP-compatible cabling or other infrastructure).

These as well as other aspects, advantages, and alternatives will become apparent to those of ordinary skill in the art by reading the above detailed description with reference where appropriate to the accompanying drawings. Further, it should be understood that the description provided in this summary section and elsewhere in this document is intended to illustrate the claimed subject matter by way of example and not by way of limitation.

II. EXAMPLE METHODS

Figure 3:
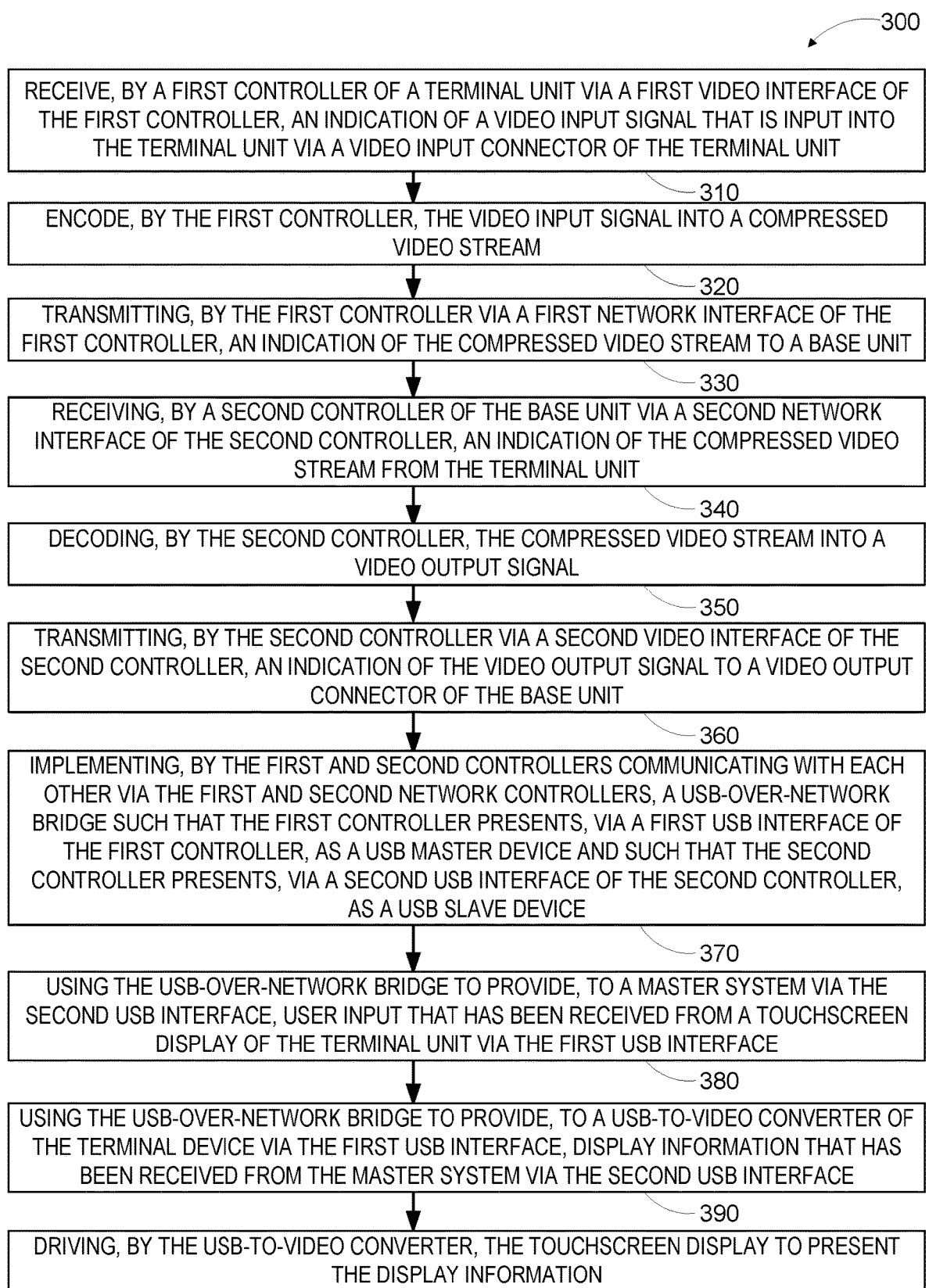
FIG. 3 is a flowchart of an example method, according to an example embodiment.

FIG. 3 is a flowchart of a method 300 as described herein. The method 300 includes receiving, by a first controller of a terminal unit via a first video interface of the first controller, an indication of a video input signal that is input into the terminal unit via a video input connector of the terminal unit (310).

The method 300 additionally includes encoding, by the first controller, the video input signal into a compressed video stream (320).

The method 300 additionally includes transmitting, by the first controller via a first network interface of the first controller, an indication of the compressed video stream to a base unit (330).

The method 300 additionally includes receiving, by a second controller of the base unit via a second network interface of the second controller, an indication of the compressed video stream from the terminal unit (340).

The method 300 additionally includes decoding, by the second controller, the compressed video stream into a video output signal (350).

The method 300 additionally includes transmitting, by the second controller via a second video interface of the second controller, an indication of the video output signal to a video output connector of the base unit (360).

The method 300 additionally includes implementing, by the first and second controllers communicating with each other via the first and second network controllers, a USB-over-network bridge such that the first controller presents, via a first USB interface of the first controller, as a USB master device and such that the second controller presents, via a second USB interface of the second controller, as a USB slave device (370).

The method 300 additionally includes using the USB-over-network bridge to provide, to a master system via the second USB interface, user input that has been received from a touchscreen display of the terminal unit via the first USB interface (380).

The method 300 additionally includes using the USB-over-network bridge to provide, to a USB-to-video converter of the terminal device via the first USB interface, display information that has been received from the master system via the second USB interface (390).

The method 300 additionally includes driving, by the USB-to-video converter, the touchscreen display to present the display information (395).

The method 300 could include additional or alternative steps or features. Additionally or alternatively, the method 300 could be limited to only those steps performed by elements (e.g., controllers, USB-to-video converters, touchscreen displays, etc.) of one or the other of the terminal unit or the base unit. For example, an alternative method could include only those steps and/or operations performed by the terminal unit, or specifically by the first controller of the terminal unit, to implement the above method 300. Yet another alternative method could include only those steps and/or operations performed by the base unit, or specifically by the second controller of the base unit, to implement the above method 300.

III. CONCLUSION

The above detailed description describes various features and functions of the disclosed systems, devices, and methods with reference to the accompanying figures. In the figures, similar symbols typically identify similar components, unless the context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments.

Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims

We claim:
1. A system comprising:
 a base unit that comprises:
  a first controller, wherein the first controller includes a first video interface, a first USB interface, and a first network interface; and
  a video output connector; and
 a terminal unit that comprises:
  a second controller, wherein the second controller includes a second video interface, a second USB interface, and a second network interface;
  a touchscreen display comprising a USB touch interface and a display interface, wherein the USB touch interface is communicatively coupled to the second USB interface;
  a USB-to-video converter that is communicatively coupled to the second USB interface and that is configured to receive, as a slave device, display data from the second USB interface and to drive the touchscreen display to present the display data; and
  a video input connector;
 wherein the second controller is configured to receive, via the second video interface, an indication of a video input signal that is input into the terminal unit via the video input connector, to encode the video input signal into a compressed video stream, and to transmit an indication of the compressed video stream to the base unit via the second network interface;
 wherein the first controller is configured to receive, from the terminal unit via the first network interface, an indication of the compressed video stream, to decode the compressed video stream into a video output signal, and to transmit, via the first video interface, an indication of the video output signal to the video output connector; and
 wherein the first controller is configured to present as a USB slave device via the first USB interface, the second controller is configured to present as a USB master device via the second USB interface, and the first and second controllers are configured to communicate with each other via the first and second network interfaces, respectively, to implement a USB-over-network bridge, thereby allowing (i) display information to be received, from a master system via the first USB interface, and transmitted to the USB-to-video converter via the second USB interface, thereby resulting in the touchscreen display being driven to present the display information, and (ii) user input to be received, from the touchscreen display via the second USB interface, and transmitted to the master system via the first USB interface.

2. The system of claim 1, wherein the video input signal is compatible with the High-Definition Multimedia Interface (HDMI) standard.

3. The system of claim 2, wherein the terminal unit additionally comprises an HDMI transceiver, wherein the second video interface of the second controller is communicatively coupled to the video input connector via the HDMI transceiver.

4. The system of claim 1, wherein the input video signal includes at least one audio information channel.

5. The system of claim 1, wherein at least one of the first controller or the second controller includes an AST1620 system-on-chip.

6. The system of claim 1, wherein the video input signal has a resolution greater than or equal to 4K.

7. The system of claim 1, wherein a latency between reception of a frame of the video input signal at the video input connector and transmission of a corresponding frame of the video output signal at the video output connector is less than 100 milliseconds.

8. The system of claim 1, wherein the terminal unit further comprises a USB hub, and wherein the second USB interface of the second controller is communicatively coupled to the USB touch interface and to the USB-to-video converter via the USB hub.

9. The system of claim 8, wherein the terminal unit further comprises a USB connector, and wherein the second USB interface of the second controller is communicatively coupled to the USB connector via the USB hub.

10. The system of claim 1, wherein the USB-to-video converter includes a DisplayLink/Synaptics DL4120.

11. The system of claim 1, wherein the second controller being configured to transmit the indication of the compressed video stream to the base unit via the second network interface comprises the second controller being configured to transmit the indication of the compressed video stream to the base unit via the second network interface using the Internet Protocol, and wherein the first and second controllers being configured to communicate with each other via the first and second network interfaces, respectively, to implement the USB-over-network bridge comprises the first and second controllers being configured to communicate with each other via the first and second network interfaces, respectively, using the Internet Protocol.

12. A system comprising:
a controller, wherein the controller includes a video interface, a USB interface, and a network interface;
a touchscreen display comprising a USB touch interface and a display interface, wherein the USB touch interface is communicatively coupled to the USB interface;
a USB-to-video converter that is communicatively coupled to the USB interface and that is configured to receive, as a slave device, display data from the USB interface and to drive the touchscreen display to present the display data; and
a video input connector;
wherein the controller is configured to receive, via the video interface, an indication of a video input signal that is input into the system via the video input connector, to encode the video input signal into a compressed video stream, and to transmit an indication of the compressed video stream to a base unit via the network interface; and
wherein the controller is configured to present as a USB master device via the USB interface, and the controller is configured to communicate with the base unit via the network interface to implement a USB-over-network bridge, thereby allowing (i) display information to be received, from a master system via the base unit and transmitted to the USB-to-video converter via the USB interface, thereby resulting in the touchscreen display being driven to present the display information, and (ii) user input to be received, from the touchscreen display via the USB interface, and transmitted to the master system via the base unit.

13. The system of claim 12, wherein the video input signal is compatible with the High-Definition Multimedia Interface (HDMI) standard.

14. The system of claim 13, wherein the system additionally comprises an HDMI transceiver, wherein the video interface of the controller is communicatively coupled to the video input connector via the HDMI transceiver.

15. The system of claim 12, wherein the input video signal includes at least one audio information channel.

16. The system of claim 12, wherein the controller includes an AST1620 system-on-chip.

17. The system of claim 12, wherein the video input signal has a resolution greater than or equal to 4K.

18. The system of claim 12, wherein the system further comprises a USB hub, and wherein the USB interface of the controller is communicatively coupled to the USB touch interface and to the USB-to-video converter via the hub.

19. The system of claim 18, wherein the system further comprises a USB connector, and wherein the USB interface of the controller is communicatively coupled to the USB connector via the USB hub.

20. The system of claim 12, wherein the controller being configured to transmit the indication of the compressed video stream to the base unit via the network interface comprises the controller being configured to transmit the indication of the compressed video stream to the base unit via the network interface using the Internet Protocol, and wherein the controller being configured to communicate with the base unit via the network interface to implement the USB-over-network bridge comprises the controller being configured to communicate with the base unit via the network interface using the Internet Protocol.

* * * * *